Oct. 23, 1956  M. D. RUST  2,767,486
MOBILE DEVICE FOR REMOVING MOISTURE FROM GROWING PLANTS
Filed Jan. 23, 1953  3 Sheets-Sheet 1
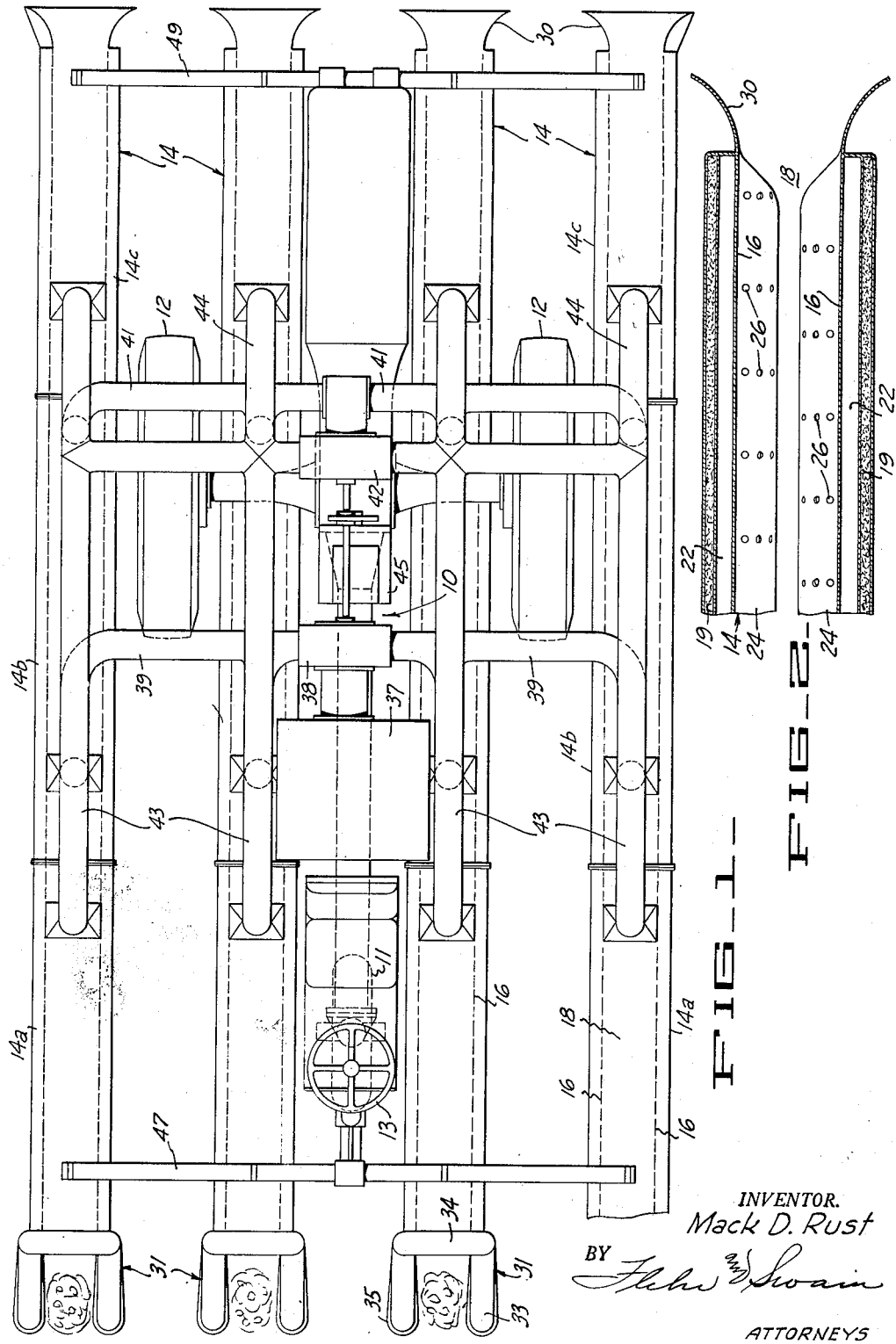
INVENTOR.
Mack D. Rust
BY
ATTORNEYS Oct. 23, 1956  M. D. RUST  2,767,486
MOBILE DEVICE FOR REMOVING MOISTURE FROM GROWING PLANTS
Filed Jan. 23, 1953  3 Sheets-Sheet 2
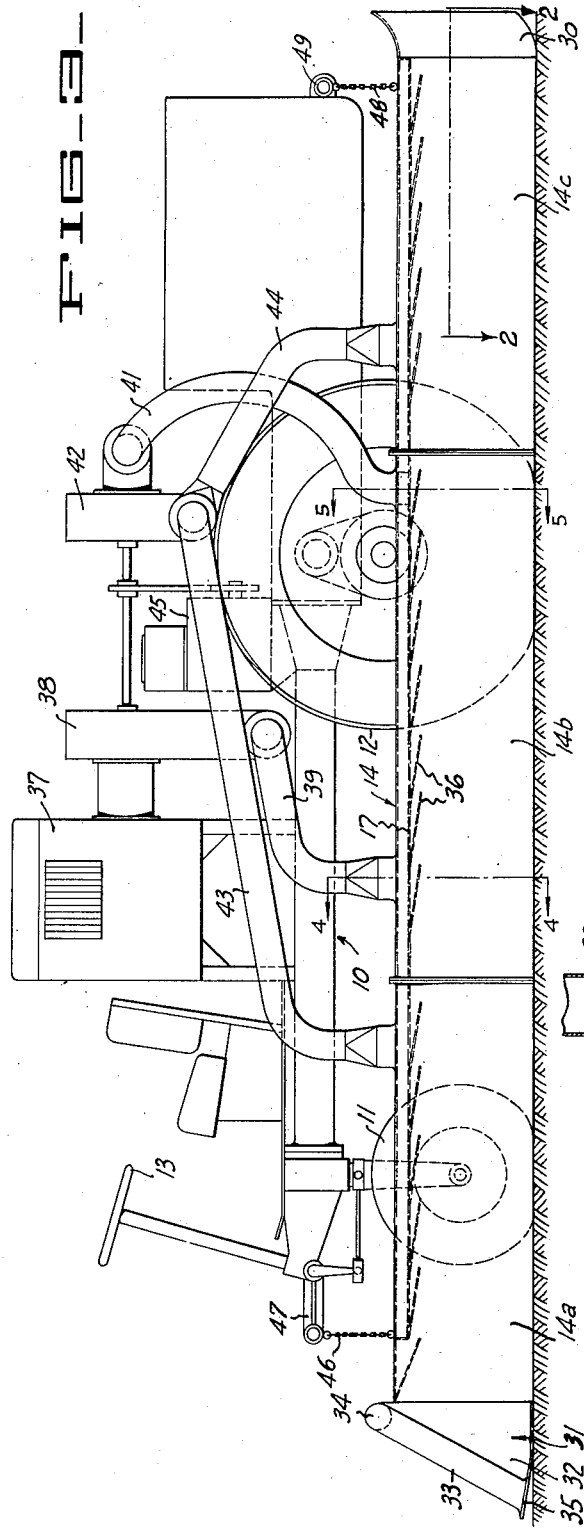
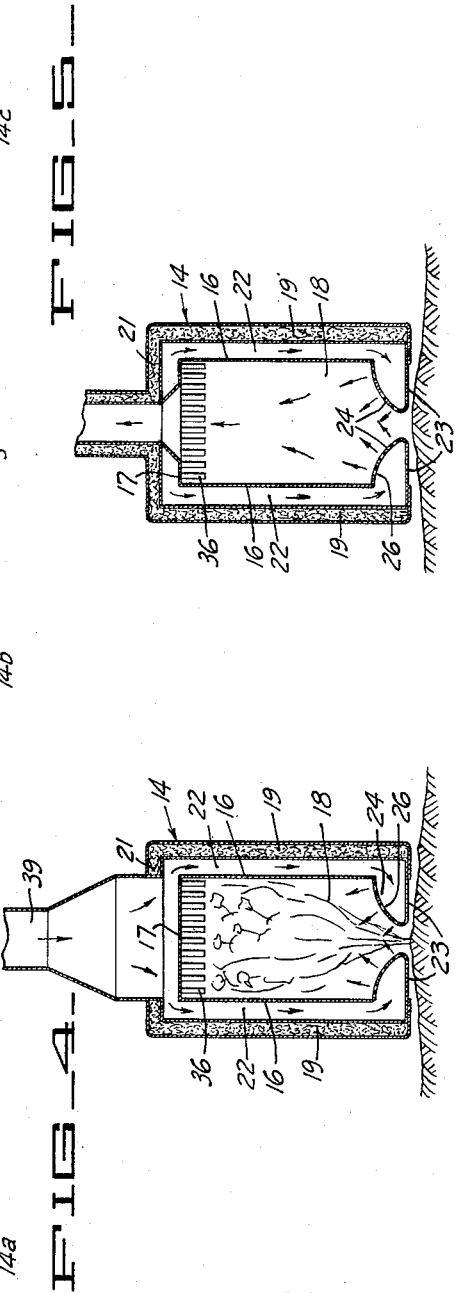
INVENTOR.
Mack D. Rust
BY
ATTORNEYS Oct. 23, 1956 M. D. RUST 2,767,486
MOBILE DEVICE FOR REMOVING MOISTURE FROM GROWING PLANTS
Filed Jan. 23, 1953 3 Sheets-Sheet 3
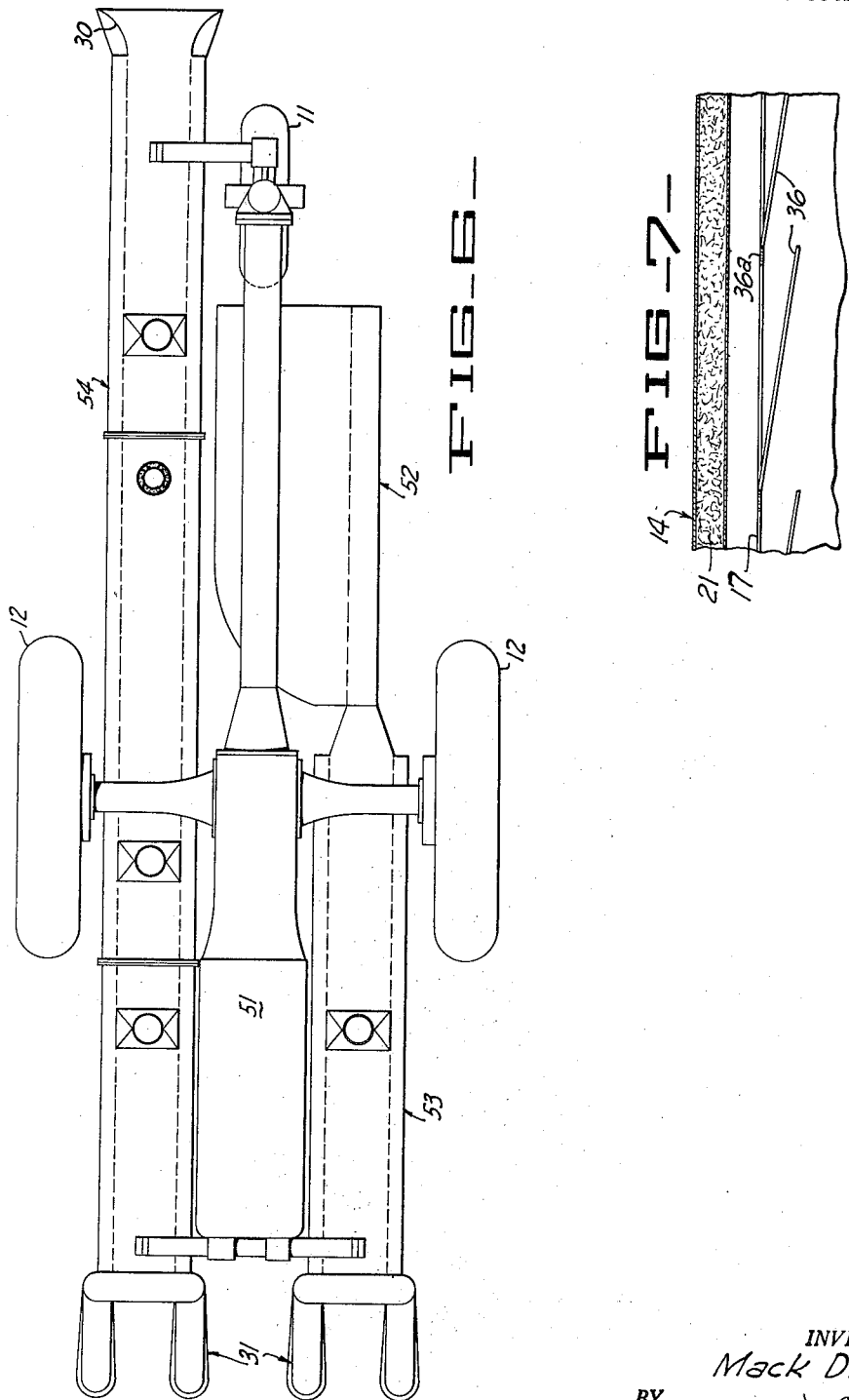
INVENTOR.
Mack D. Rust
BY
ATTORNEYS United States Patent Office 2,767,486
Patented Oct. 23, 1956

2,767,486

MOBILE DEVICE FOR REMOVING MOISTURE FROM GROWING PLANTS

Mack D. Rust, Coalinga, Calif.

Application January 23, 1953, Serial No. 332,870

9 Claims. (Cl. 34—218)

This application relates generally to methods for the mechanical field picking of cotton, and to machines used in carrying out such methods.

The mechanical picking of cotton, as carried out in California and in other localities, is dependent upon the condition of the weather during and immediately prior to the picking operation. If the exposed cotton fiber is wet, because of rain, fog or dew, effective picking is seriously impaired or made altogether impossible. To understand the detrimental effect of moisture, it should be understood that conventional cotton picking machines depend upon adhesion of the exposed cotton fiber to moistened rotating picking spindles, and such adhesion is impaired or prevented by wet condition of the fiber. By way of example, in one type of cotton picking machine, which can be referred to as of the "Rust" type (see for example Patents Nos. 1,894,198, 2,058,504, 2,085,046, and 2,466,969), the picking spindles are in the form of small rods which are carried by endless elongated belts or chains and rotated by drive means. During operation of the machine, the spindles cyclically progress through a picking zone in which the spindles are thrust into the plants, a stripping zone in which cotton carried by the spindles is removed, and a moistening zone in which moisture is applied to the spindles before returning them to the picking zone. The surface moisture applied to the spindles is only sufficient to cause the exposed cotton fiber to adhere to the spindle upon contacting the same whereby as the spindle rotates the fiber is wound thereon and removed from the boll.

Because of the detrimental effect of moisture upon cotton picking operations, it is frequently necessary to postpone operations until the weather conditions are such that the condition of excessive moisture does not prevail. This may mean postponement of operations for periods ranging from a few hours to several days. At the height of the picking season, such delays are a serious matter, and may seriously increase picking costs.

In general it is an object of the present invention to provide a novel method for the mechanical picking of cotton which makes it possible to effectively pick under moist conditions which would normally make picking inexpedient or impossible.

Another object of the invention is to provide a method of the above character which effectively conditions the outer exposed layer of cotton fiber for optimum mechanical picking.

A further object of the invention is to provide a novel machine for carrying out the present method, and particularly a machine capable of drying cotton in the field and preparing it for mechanical picking operations.

Additional objects and features of the invention will appear from the following description in which the preferred embodiment has been set forth in detail in conjunction with the accompanying drawing.

Referring to the drawing:

Figure 1 is a plan view illustrating a machine incorporating the present invention.

Figure 2 is a fragmentary detail illustrating the means employed for introducing hot air into the hood-like plant enveloping device, and taken along the line 2—2 of Figure 3.

Figure 3 is a side elevational view of the machine shown in Figure 1.

Figure 4 is a cross-sectional view taken along the line 4—4 of Figure 3, on an enlarged scale.

Figure 5 is a cross-sectional view taken along the line 5—5 of Figure 3, on an enlarged scale.

Figure 6 is a plan view illustrating another embodiment of the invention.

Figure 7 is an enlarged fragmentary elevational view, with parts broken away and shown in section, of the hood showing another type of mounting means for the fingers 36.

This machine can consist of a frame 10 which is adapted to be traversed over a cotton field. In this instance the frame is shown provided with a single front and two rear ground engaging wheels 11 and 12, the former being mounted and mechanically connected to the steering hand wheel 13. While the frame can be towed by a tractor, in this instance it is assumed that the frame is motor powered. The spacing between the rear wheels 12 is assumed to be such as to permit the wheels to operate in furrows between the plants.

The main frame carries a plurality of plant enveloping devices 14. As the machine advances, the plants are enveloped within these devices for a sufficient period of time for the desired treatment. In a simple machine a single plant enveloping device 14 can be provided for operation upon one row of plants. Generally, however, it is desirable to operate upon a plurality of rows simultaneously, and in the instance illustrated the machine is equipped with four devices.

Each of the plant enveloping devices can consist of side and top walls 16 and 17 (Figures 4 and 5) which serve to define a tunnel-like space 18. Spaced outwardly from the walls 16 and 17 I provide the side and top walls 19 and 21. The spaces between the two sets of the walls provide passages 22 for flow of air. The lower edges of the side walls 19 are attached to the inwardly extending bottom walls 23. The innermost edges of walls 23 are connected to the lower edges of the inner wall 16, by the curved or arched wall portions 24. Wall portions 24 are provided with a plurality of openings 26 for discharging air into the space 18. It is preferable that the openings 26 be formed in longitudinally spaced groups as illustrated particularly in Figure 2. Air discharging from these openings is directed upwardly through the plants, and inwardly toward the longitudinal center of the space 18.

Preferably each plant enveloping device is made in a plurality of connected sections designated 14a, 14b, and 14c. This construction facilitates manufacturing, assembly, and servicing, and it also enables the type of air circulating system to be presently described. The entrant end of the section 14a is provided with the mouth structure 31, and the rear end is provided with the flared plant egress structure 30. The mouth structure 31 can consist of side walls 32, rounded plant engaging members 33 and 34, and the upwardly inclined ground engaging shoes 35.

Below the upper wall 17 of each plant enveloping device, I preferably provide the fingers 36, which can be formed of suitable material such as spring wire. These fingers are preferably disposed in longitudinally spaced rows, with their free ends extending rearwardly and inclined downwardly. The fingers 36 engage the upper portions of plants, whereby the space between the wall 17 and the lower portions of these fingers is substantially unobstructed (by the plants) for flow of air. The fingers can be carried by wall 17, or by means such as spaced horizontal bars 36a disposed a short distance below the wall 17, as shown in Figure 7.

Various means can be employed for maintaining a drying atmosphere within the space 18. The equipment illustrated for this purpose consists of an air heater 37, which can be of the type making use of a fuel like oil or butane, with direct intermingling of the products of combustion and air to provide a gas mixture of the desired temperature. The gas (i. e. gaseous mixture) from the heater 37 is shown being delivered by a blower 38 to the conduits 39, each of which connect through the top wall 21 of the section 14b (Figure 4). The hot gas thus delivered to each section 14b flows downwardly through passages 22 and about the walls 16 and 17, to be discharged through the openings 26. The air from the upper portion of space 18 is withdrawn through one of a plurality of conduits 41, and assuming that it is desired to recirculate this air, it can be recirculated by blower 42 through the conduits 43 and 44. Each pair of conduits 43 and 44 connect through the top wall 21 of the corresponding sections 14a and 14c. Blowers 38 and 42 can be driven by a single motor 45, which for example can be of the electric or gasoline type.

Assuming that a conduit and blower system of the character described is employed with connections to the various sections, it is desirable to employ suitable air flow blocking walls for the passages 22, between the sections 14a and 14b, and also between sections 14b and 14c. Hot air delivered by conduit 39 is generally confined to section 14b, and the air withdrawn through conduit 41 is delivered to sections 14a and 14c and eventually discharged to the atmosphere through the forward and rear ends of the plant enveloping device.

Various arrangements can be used for attaching the plant enveloping devices to the frame of a machine. The simple arrangement illustrated makes use of chains 46 which connects the forward end of each device 14 to the arms 47, and which are carried by the machine frame. Similarly, the rear end of each device 14 is shown being attached by a chain 48 to an attaching means 49 on the frame.

Operation of the machine described above is as follows: Assuming that the heater 37 is in operation, and that the blowers 38 and 42 are being driven by the motor 45, the machine is traversed over a cotton field and aligned with the plant rows, whereby each device 14 envelopes the plants of a row. As plants are progressively enveloped they are somewhat bent over by engagement of their upper portions with the fingers 36. Within each device 14 the plants are subjected to currents of hot drying gas being discharged from the openings 26, and such drying gas circulates upwardly through the plants, thus subjecting all of the exterior surfaces of the plant to drying. With the type of circulating system illustrated, the drying gas in the section 14b is at the highest temperature level. Gas from the section 14b is applied to the sections 14a and 14c and is at somewhat lower temperature levels. At all times the relative humidity of the drying gas is such that no moisture is permitted to condense upon the surfaces of the plants, or upon the walls of the plant enveloping device. Although a substantial part of the drying is by virtue of direct contact of drying gas with the exterior surfaces of the plants, drying is also promoted by exposure to heat radiated from the walls 16 and 17. These walls are heated by contact with the gas being circulated through the passages 22.

My method is carried out by use of a cotton plant drying machine such as described above, together with a mechanical cotton picker of the type in which the picking spindles are moistened and brought into contact with the exposed cotton. Assuming that a condition of excessive moisture exists, sufficient to interfere with proper operation of a mechanical cotton picker, then the drying machine described above is passed over the plants before the mechanical picking operation. The surface layer of the exposed cotton is thereby subjected to drying to remove excessive moisture, and to condition the fiber in such a manner that it will properly adhere to the moistened spindles of the cotton picking machine. The mechanical picking operation is then carried out immediately or shortly after the drying operation.

The drying temperature employed will vary in accordance with atmospheric and moisture conditions. Where the amount of moisture upon the outer layer of exposed cotton fiber is not excessive, the drying temperatures employed may not be as high as when a greater amount of moisture is present. In general, the temperature of drying gas as delivered by the conduit 39 may vary from say 180 to 350° F., depending upon the conditions encountered.

My method does not involve the complete baking out of the cotton bolls, to provide a uniformly low moisture content. tI does involve a relatively rapid or flash heating of the surfaces of the boll, and particularly the exposed layer of the cotton fiber. In fact at the time of mechanical picking (with my method) the exposed layer of cotton fiber may have a moisture content substantially less than the moisture content of the interior of the boll. Complete baking out of the bolls is specifically avoided because of the relatively great amount of heat required and because of the danger of excessive heating which would result in injury to the fiber and seeds. With my method the moisture content of the cotton well within the boll is not materially changed. Also the intensity of the heat is not sufficient to cause injury to either the fiber or the seeds.

It will be evident from the foregoing that I have provided a machine which can be successfully used for the field drying of cotton preparatory to mechanical cotton picking, and in addition I have provided a novel method which makes possible the mechanical picking of cotton under a wide variety of field conditions. For example, where a recent rain has resulted in moist conditions which would otherwise take one or more days to overcome, my machine and method makes it possible to carry out efficient mechanical picking in the matter of a few hours after the rain has ceased. Also my method makes it possible to save time in commencing picking operations after a heavy morning dew, or when sufficient fog exists to moisten the cotton or to prevent natural drying following a rain fall.

As previously pointed out, according to the present method, picking is carried out immediately or shortly after treatment with my drying machine. In some instances it may be desirable to incorporate drying means in conjunction with a cotton picking machine. Figure 6 schematically illustrates a machine of this character. Thus the tractor 51 in this instance carries a cotton picker 52, which can be of the "Rust" type, and the mouth of this picker can connect with the rear end of the plant enveloping device 52. It is assumed that the device 53 is connected to a source of hot drying gas or air, and is adapted to remove moisture from the plants substantially in the same manner as described with respect to the machine of Figures 1 to 5 inclusive. Where additional drying effect is desired, which can not be supplied by the single plant enveloping device 53, the machine can be equipped with an additional plant enveloping device 54, which can be used to dry a row of plants in advance of the row being picked.

I claim:

1. In a machine for the treatment of cotton plants preparatory to a mechanical picking operation, a frame adapted to be traversed along a row of plants, and means carried by the frame serving to remove moisture from the plants.

2. In a machine for the treatment of cotton plants preparatory to a mechanical picking operation, a frame adapted to be traversed along a row of plants, plant enveloping means carried by the frame and through which plants of a row are caused to pass, and means carried by said frame for maintaining a drying atmosphere in the said plant enveloping means to effect removal of moisture from the plants.

3. In a machine for the treatment of cotton plants preparatory to mechanical picking operations, a frame adapted to be traversed along a row of plants, plant enveloping means carried by the frame and through which plants of a row are caused to pass as the machine advances, and means carried by said frame for maintaining a drying atmosphere within said plant enveloping means, whereby moisture is removed from the plants, said last means including means for delivering drying air to said plant enveloping means.

4. In a machine for the treatment of cotton plants preparatory to mechanical picking operations, a frame adapted to be traversed along a row of plants, a hood-like plant enveloping means carried by the frame through which plants of a row are caused to pass as the machine advances, and means carried by said frame for delivering hot drying air into said plant enveloping means, said last means including a conduit for conducting hot drying air through the lower portions of said plant enveloping means adjacent the ground surface, and means in the lower portions of said plant enveloping means for causing such air to be discharged into the space occupied by the plants, in a generally upward direction.

5. In a machine for the treatment of cotton plants, preparatory to a mechanical picking operation, a frame adapted to be traversed along a row of plants, a hood-like device carried by the frame and through which the plants of a row are caused to pass as the machine advances, an air heater carried by the frame, means for delivering hot air from said air heating means to said device whereby the hot air is discharged into the space occupied by the plants in a generally upward direction, and conduit means for removing air from communicating with the upper portion of said space in a region above the plant and serving to remove air from said space.

6. In a machine for the treatment of cotton plants preparatory to a mechanical picking operation, a frame adapted to be traversed along a row of plants, a hood-like plant enveloping device carried by the frame and forming a confined space through which plants of a row are caused to pass as the machine advances, an air heater carried by the frame, means carried by the frame for delivering hot air from the heater to said device, said device including spaced walls forming conduits for flow of hot air about said space and into the same in a generally upward direction, and conduit means communicating with the upper portions of said device and serving to remove air from the upper portion of said space.

7. Apparatus as in claim 6 in which the hood-like plant enveloping device is formed in a plurality of connected sections disposed end to end, and in which air removed from one section is delivered to another section.

8. In a machine for the treatment of cotton plants preparatory to a mechanical picking operation, a frame adapted to be traversed along a row of plants, a hood-like enveloping device carried by the frame through which plants of a row are caused to pass as the machine advances, said device forming a tunnel-like space to accommodate the plants, an air heater carried by the frame, means for delivering hot air from the heater to said device, said means serving to cause hot air to flow into said space in a generally upward direction, and means for removing air from the upper portion of said space in a region above the plants, and fingers mounted in the upper portion of said space, said fingers being inclined downwardly and directed rearwardly and being distributed longitudinally of said space, said fingers serving to engage the upper portions of plants.

9. A machine for the treatment of cotton plants preparatory to mechanical picking operations comprising a frame adapted to be traversed along a row of plants, a hood-like plant enveloping device carried by the frame through which plants of a row are caused to pass as the machine advances, means carried by said frame for maintaining a drying atmosphere within said device whereby moisture is removed from the plants advancing therethrough, a plurality of fingers mounted within said device and in the upper portion of the space enveloped by said device, said fingers being inclined downwardly and directed rearwardly and being distributed longitudinally of the space within said device, said fingers serving to engage the upper portions of plants, and conduit means for removing air from the upper portion of said space.

References Cited in the file of this patent

UNITED STATES PATENTS

| 1,513,138 | Tarnok | Oct. 28, 1924 |
| 1,775,703 | Stokes | Sept. 16, 1930 |
| 2,397,363 | McLeod | Mar. 26, 1946 |
| 2,465,070 | Demuth | Mar. 22, 1949 |
| 2,513,480 | Heth | July 4, 1950 |
| 2,620,611 | Russell | Dec. 9, 1952 |
| 2,639,353 | Russell | May 26, 1953 |

FOREIGN PATENTS

| 601,168 | Great Britain | Apr. 29, 1948 |